United States Patent
Cox, Jr.

(10) Patent No.: US 8,159,335 B2
(45) Date of Patent: Apr. 17, 2012

(54) CONTROLLING A USER'S INTERACTION WITH A KEYBOARD OF A MULTI-APPLICATION ELECTRONIC DEVICE

(75) Inventor: Patrick Herbert Cox, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1298 days.

(21) Appl. No.: 11/371,745

(22) Filed: Mar. 9, 2006

(65) Prior Publication Data

US 2007/0214393 A1    Sep. 13, 2007

(51) Int. Cl.
*H04B 3/36* (2006.01)
(52) U.S. Cl. .................................. 340/407.1
(58) Field of Classification Search ............... 340/407.1, 340/407.2; 361/600, 679, 680
See application file for complete search history.

(56) References Cited

U.S. PATENT DOCUMENTS

| | | | |
|---|---|---|---|
| 5,305,238 A | | 4/1994 | Starr, III et al. |
| 5,792,972 A | * | 8/1998 | Houston ........................ 84/645 |
| 5,868,647 A | | 2/1999 | Belsole |
| 5,888,173 A | | 3/1999 | Singhal |
| 6,065,138 A | * | 5/2000 | Gould et al. .................... 714/47 |
| 6,142,910 A | | 11/2000 | Heuvelman |
| 6,298,324 B1 | * | 10/2001 | Zuberec et al. ............... 704/251 |
| 6,581,025 B2 | | 6/2003 | Lehman |
| 2006/0058049 A1 | * | 3/2006 | McLaughlin et al. ........ 455/466 |
| 2006/0139312 A1 | * | 6/2006 | Sinclair et al. ................ 345/156 |
| 2006/0281448 A1 | * | 12/2006 | Plestid et al. ................. 455/418 |
| 2007/0078625 A1 | * | 4/2007 | Murphy et al. ............... 702/176 |
| 2009/0115730 A1 | * | 5/2009 | Kim .............................. 345/168 |

OTHER PUBLICATIONS

RSIGuard helps you take control of repetitive strain injuries, 2000-2004.*
A detailed analysis of RSIGuard's datalogger functionality, Apr. 2004.*

* cited by examiner

*Primary Examiner* — Chi Pham
*Assistant Examiner* — Fan Ng
(74) *Attorney, Agent, or Firm* — Steven E. Bach

(57) ABSTRACT

Methods, apparatus, and computer program products for controlling a user's interaction with a keyboard of a multi-application electronic device such as a personal digital assistant. In one embodiment, a keyboard usage statistic for the user is determined and compared with a usage limit. Responsive to the comparison, an input mode capability of the device may be altered by throttling keyboard input to a first application such as a text input application while permitting unlimited input to a second application such as a speech input application. Altering an input mode capability may include at least one of: disabling a keyboard function, enabling an alternate input mechanism, and instructing the user to use the alternate input mechanism.

19 Claims, 2 Drawing Sheets

CONTROLLING A USER'S INTERACTION WITH A KEYBOARD OF A MULTI-APPLICATION ELECTRONIC DEVICE

FIELD OF THE INVENTION

The invention applies to the field of electronic devices with keyboards, or equivalently keypads, and more particularly to controlling a user's interaction with the keyboard of such a device.

BACKGROUND

Someone who overuses or misuses a keyboard or keypad to enter data into an electronic device may be subject to orthopedic problems known generally as repetitive-motion or repetitive-use injuries. Such injuries reportedly may become more likely as the size of the keyboard or keypad decreases. For example, users may respond to ergonomic challenges presented by some very small keypads by entering data using only their thumbs, thereby risking inflammation of the sheath around the tendons of the thumbs if the keypad is used excessively.

Nevertheless, small electronic devices such as personal digital assistants, cellular telephones, and laptop computers have become extremely versatile, and may offer a wide variety of applications to the user. Consequently, approaches to guarding against repetitive-motion injuries developed for single-application devices such as typewriters are not necessarily suitable for modern multi-application electronic devices, since the user may interact with the multi-application device in different ways when using it for different applications.

SUMMARY

Aspects of the invention include methods, apparatus, and computer program products for controlling a user's interaction with a keyboard or keypad of a multi-application electronic device such as a personal digital assistant, cellular telephone, or laptop computer, so as, for example, to minimize the likelihood of repetitive-motion injury, or for other purposes.

In an exemplary method encompassed by the invention, a keyboard usage statistic for the user is determined; the usage statistic is compared with a usage limit; and an input mode capability of the electronic device may be altered responsive to comparing the usage statistic with the usage limit by throttling keyboard input to a first application while permitting substantially unlimited input to a second application. The first application may be, for example, a text input application and the second application may be, for example, a voice input application. Altering an input mode capability may include, for example, some combination of disabling a keyboard function, enabling an alternate input mechanism, and instructing the user to use the alternate input mechanism. In some embodiments of the invention, the usage limit may be determined based on profile information entered by the user.

An exemplary electronic device according to the invention may include logic for determining a keyboard usage statistic for the user; logic for comparing the usage statistic with a usage limit; and logic for altering an input mode capability of the electronic device responsive to comparing the usage statistic with the usage limit by throttling keyboard input to a first application while permitting substantially unlimited input to a second application. The first application may be, for example, a text input application and the second application may be, for example, a voice input application. The device may include an alternate input mechanism, and the logic for altering an input mode capability may include logic for disabling at least one keyboard function, enabling the alternate input mechanism, or instructing the user to use the alternate input mechanism, or some combination thereof. The alternate input mechanism may be, for example, a speech recognition input mechanism. The device may also include logic for accepting profile information entered by the user and determining the usage limit based on the profile information.

BRIEF DESCRIPTION OF THE SEVERAL VIEWS OF THE DRAWINGS

The invention will now be described in more detail, with reference to the accompanying drawings, wherein.

DETAILED DESCRIPTION

Figure 1:
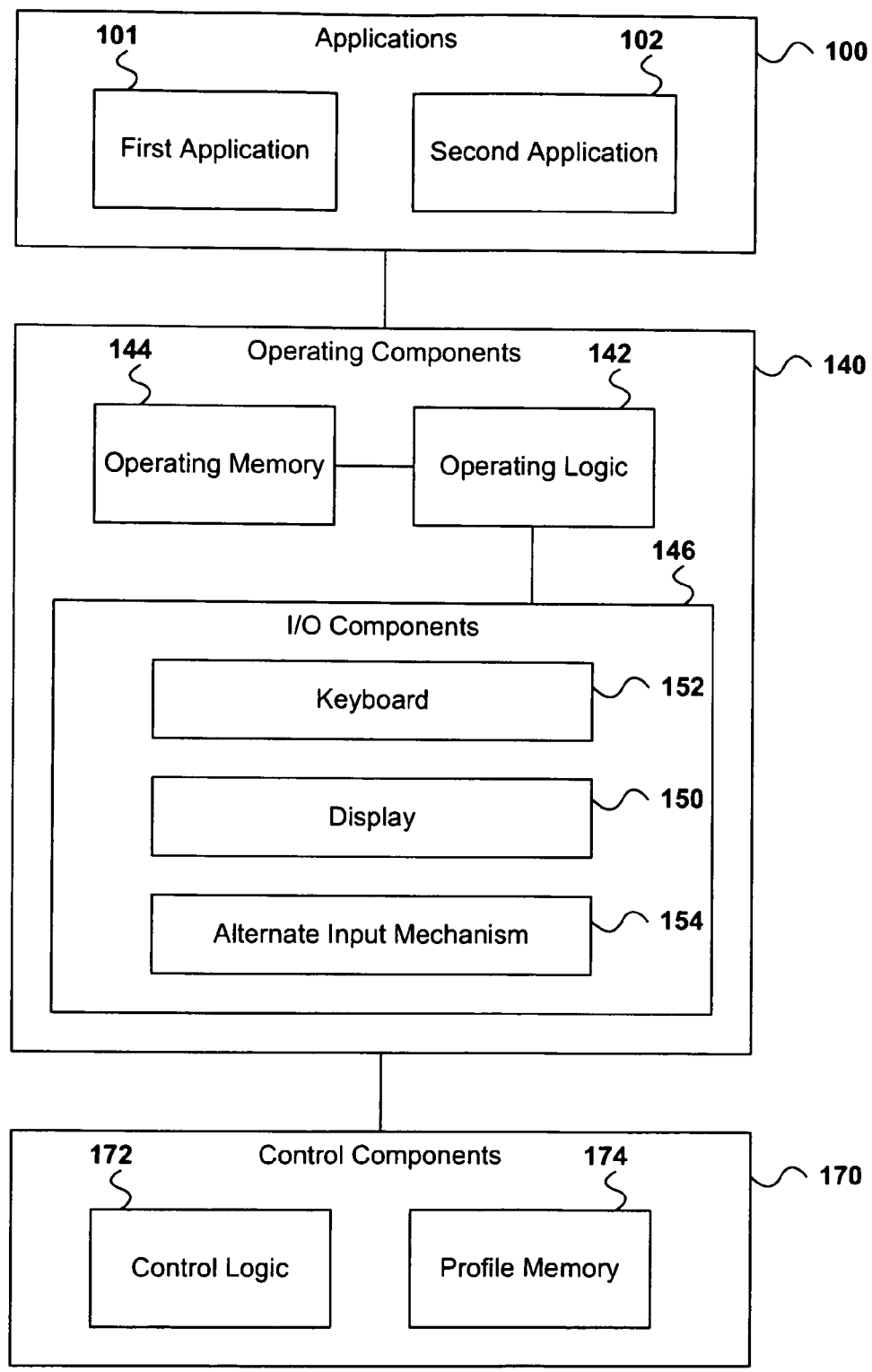
FIG. 1 is an exemplary block diagram that shows structural aspects of the invention.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer readable storage medium having computer-usable program code embodied in the medium. Any suitable computer-readable medium may be utilized, including computer readable storage mediums, such as: hard disks, CD-ROMs, optical storage devices, and magnetic storage devices. Alternatively, computer readable medium may include transmission media such as those supporting the Internet or an intranet.

Computer program code for carrying out operations of the present invention may be written in an object oriented programming language such as Java, Smalltalk, or C++. However, the computer program code for carrying out operations of the present invention may also be written in conventional procedural programming languages, such as the C programming language. The program code may execute entirely on the user's computer, partly on the user's computer, as a standalone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to flowchart illustrations and/or block diagrams of methods, apparatus (systems), and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and/or block diagram block or blocks.

FIG. 1 is a block diagram that shows exemplary structural aspects of the invention. For descriptive convenience, the components of FIG. 1 are divided into three groups: applications 100, operating components 140, and control components 170.

FIG. 1 shows two applications, a first application 101 and a second application 102. Here, the term application is to be interpreted broadly. Examples of applications in this context include software application programs or code such as spreadsheets and electronic mail text editors. Also to be included within the meaning are hardware-only and part-hardware-part-software applications such as the hardware and code needed to provide, for example, cellular telephone functions. Thus, a multi-application device may provide its user with, for example, email, spreadsheet, and telephony applications. For descriptive purposes herein, the first application may be a text input application and the second application may be a voice input application, although the invention is not so limited.

The operating components 140 may include means for supporting the applications 100. For example, FIG. 1 shows operating logic 142, operating memory 144, and input/output (I/O) components 146. The I/O components 146 may include a display 150, a keyboard or keypad 152, and an alternate input mechanism 154. The alternate input mechanism 154 may be, for example, a speech recognition system, or a virtual keyboard that appears on the display 150 to enable the user to enter data with a stylus. The control components 170 may include control logic 172, and profile information memory 174.

It is important to understand that the aforementioned components may be grouped and allocated in different ways, according to different embodiments of the invention. For example, in one embodiment of the invention, a hand-held multi-application device may work with a server to provide email. In such an embodiment, elements of the applications 100 may reside in the handheld device and elements of the applications 100 may reside in the server. In one such configuration, the operating components 140 may reside in the handheld device, and the control components may reside in the server. In such cases, the operating logic 142 and the control logic 172 may be provided by separate circuitry or processors, and the operating memory 144 may be separate from the profile memory 174.

In other embodiments of the invention, the operating components 140 and control components 170 may all reside in the handheld device. In such cases, the operating logic 142 and the control logic 172 may be provided by the same circuitry or processor, and the operating memory 144 and the profile memory 174 may be integrated.

One purpose of the control logic 172 is to determine keyboard usage. Here, the term "usage statistic" and terms indicating the specific value of the usage statistic are used interchangeably. In some embodiments, the usage statistic may be based on data gathered by the operating logic 142 by monitoring keystrokes entered by the user, for example by incrementing a counter in response to each keystroke entry. The operating logic 142 may send the data gathered or a consolidated value of the usage statistic to the control logic 172. For example, the usage statistic may be an average or a moving average of the number of keystrokes entered by the user in a predetermined period of time, such as the number of keystrokes entered in the most recent thirty minutes. In the same way, burst rates, peak rates, and longer or shorter time periods may be used. More generally, those skilled in the art will recognize that a wide variety of measures may be employed as the keyboard usage statistic, once taught the invention, and that the present invention is intended to encompass all of the various measures.

The control logic 172 compares the usage statistic with a usage limit. The usage limit may be a predetermined default or factory-set value that is widely applicable to users, or may be derived from profile information entered by the user and stored in the profile memory 174. For example, the user may provide his or her age, information regarding susceptibility or past experience with repetitive-use injuries, level of skill in keyboard entry, and the like. Based on the profile information, the usage limit may be personalized approximately to the user by selecting from a plurality of usage limits that are predetermined and stored in the profile memory 174, or by determining a usage limit when needed.

If the value of the keyboard usage statistic exceeds the usage limit, the control logic 172 provides a signal that alters, or causes to be altered, an input mode capability of the electronic device, under the supervision of the operating logic 142. Thus, responsive to comparing the usage statistic with the usage limit, keyboard input to a first application may be throttled while substantially unlimited input to a second application may be permitted. For example, keyboard entry to an email editor may be throttled, whereas keyboard entry into a cellular telephone dialing system of the same electronic device may be permitted without restriction.

Input may be throttled by disabling keyboard 152 altogether for entering data into the first application, or limiting the rate at which the keyboard 152 will accept keystroke entries for the first application to a reduced but non-zero rate. In other embodiments, various functions of the keyboard may be altered. For example, the keyboard may be restricted so as to accept only entries that are numerical, to permit a multi-application device to function as a cellular telephone but not as an email editor. In embodiments of the invention that include the alternative input mechanism 154, the control logic 172 may have the capability to enable the alternate input mechanism 154 and instruct the user to use the alternate input mechanism 154, for example through the operating logic 142 and the display 150.

Figure 2:
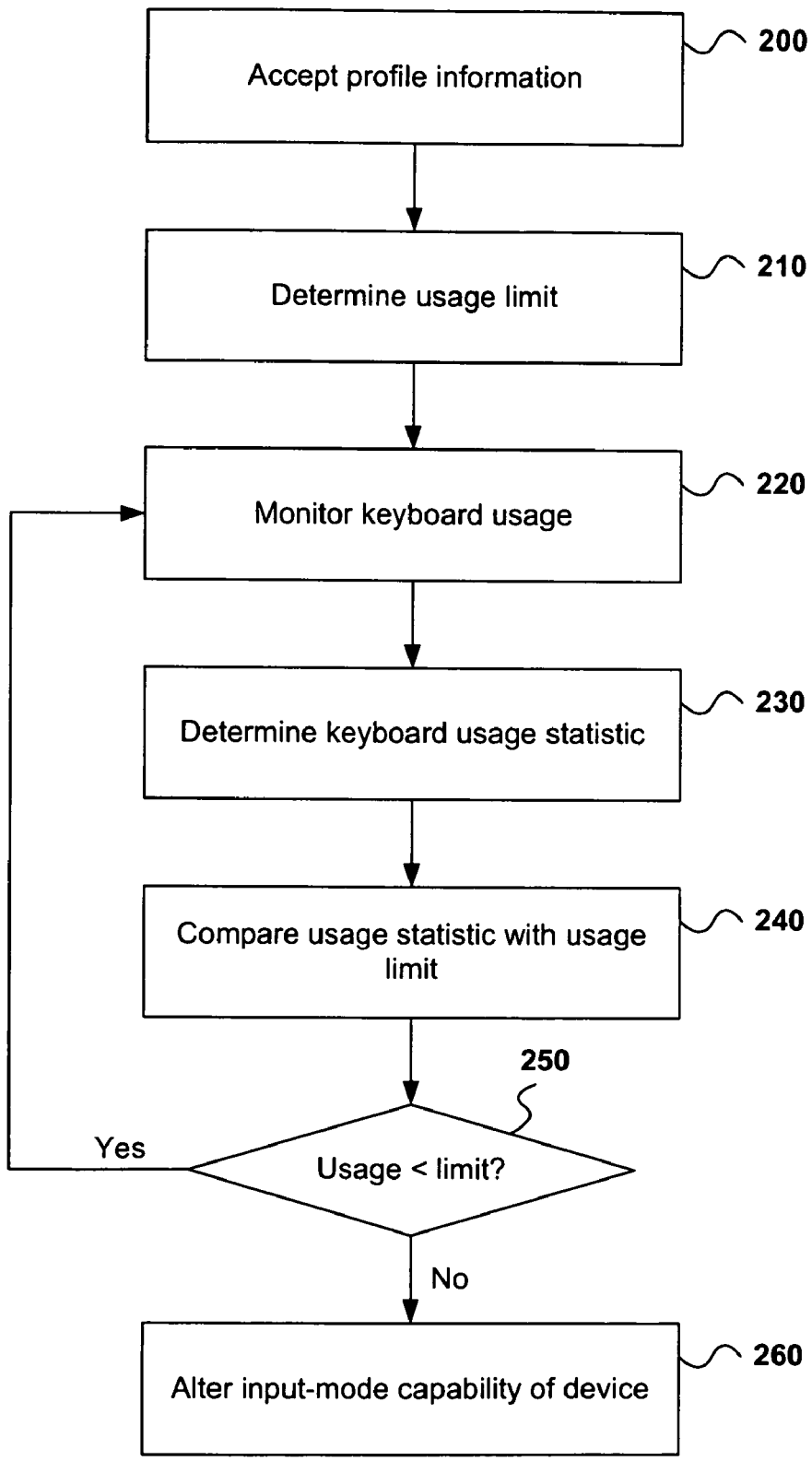
FIG. 2 is an exemplary flowchart that shows operational aspects of the invention.

FIG. 2 is a flowchart that shows exemplary operational aspects of the invention, which will now be described in the context established above with reference to FIG. 1. As shown in FIG. 2, profile information may be accepted (block 200) during a set-up phase, which information may be stored in the profile memory 174. The control logic 172 may then derive or otherwise determine a usage limit from the profile information (block 210); alternatively, a default value may be used for the usage limit.

Keyboard usage is monitored (block 220), preferably by the operating logic 142, for example by incrementing a counter for each keystroke entered by the user. A keyboard usage statistic is determined (block 230) from the data gathered by monitoring keyboard usage, preferably by the control logic 172, for example by computing a moving average over time of the number of keystroke entries.

The keyboard usage statistic is compared with the usage limit (block 240), preferably by the control logic 172. If the keyboard usage statistic is less than the usage limit (block 250, yes), the process returns to monitor keyboard usage (block 220). Otherwise (i.e., the keyboard usage statistic is greater than or equal to the usage limit; block 250, no), an input mode capability of the electronic device is altered (block 260), as described above with reference to FIG. 1.

Although the foregoing has described systems, methods, and computer program products for controlling a user's interaction with a keyboard of a multi-application electronic device, the description of the invention is illustrative rather than limiting, and the invention is limited only by the claims that follow.

What is claimed is:

1. A method for controlling a user's interaction with a keyboard of a multi-application electronic device, said method comprising:
   determining a keyboard usage statistic for the user;
   comparing the usage statistic with a usage limit; and
   altering an input mode capability of the electronic device responsive to comparing the usage statistic with the usage limit by throttling keyboard input to a first application while permitting substantially unlimited input to a second application.

2. The method of claim 1, wherein throttling comprises limiting a rate at which keyboard strokes are accepted to a reduced rate that is greater than zero.

3. The method of claim 1, wherein altering an input mode capability further comprises at least one of: disabling a keyboard function and instructing the user to use the alternate input mechanism.

4. The method of claim 1, wherein the first application is substantially a text input application and the second application is substantially a voice input application.

5. The method of claim 1, further comprising accepting profile information entered by the user and determining the usage limit based on the profile information.

6. The method of claim 1, wherein determining the usage statistic comprises determining a moving average of the number of keystrokes entered by the user over a specified time.

7. A computer program product for controlling a user's interaction with a keyboard of a multi-application electronic device, the computer program product comprising a non-transitory computer readable medium having computer readable program code embedded therein, the computer readable program code comprising:
   computer readable program code configured to determine a keyboard usage statistic for the user;
   computer readable program code configured to compare the usage statistic with a usage limit; and
   computer readable program code configured to alter an input mode capability of the electronic device responsive to comparing the usage statistic with the usage limit by throttling keyboard input to a first application while permitting substantially unlimited input to a second application.

8. The computer program product of claim 7, wherein the computer readable program code configured to alter an input mode capability comprises computer readable program code configured to throttle keyboard input to a first application by limiting a rate at which keyboard strokes are accepted to a reduced rate that is greater than zero.

9. The computer program product of claim 7, wherein the computer readable program code configured to generate at least one control signal for at least one of: disabling a keyboard function and instructing the user to use the alternate input mechanism.

10. The computer program product of claim 7, wherein the first application is substantially a text input application and the second application is substantially a voice input application.

11. The computer program product of claim 7, further comprising computer readable program code configured to accept profile information provided by the user, and computer readable program code configured to determine the usage limit based on the profile information.

12. The computer program product of claim 7, wherein the computer readable program code configured to determine the usage statistic comprises computer readable program code configured to determine a moving average number of keystrokes entered by the user over a specified time.

13. A multi-application electronic device with provision for controlling a user's interaction with a keyboard of the electronic device, said electronic device comprising:
   a processor;
   a memory operably connected to the processor and having encoded thereon program instructions, including:
   program instructions for determining a keyboard usage statistic for the user;
   program instructions for comparing the usage statistic with a usage limit; and
   program instructions logic for altering an input mode capability of the electronic device responsive to comparing the usage statistic with the usage limit by throttling keyboard input to a first application while permitting substantially unlimited input to a second application.

14. The device of claim 13, wherein throttling comprises limiting a rate at which keyboard strokes are accepted to a reduced rate that is greater than zero.

15. The device of claim 13, wherein the program instructions for altering an input mode capability comprises program instructions for at least one of: disabling a keyboard function and instructing the user to use the alternate input mechanism.

16. The device of claim 15, wherein the alternate input mechanism recognizes voice input.

17. The device of claim 13, wherein the first application is substantially a text input application and the second application is substantially a voice input application.

18. The device of claim 13, further comprising program instructions for accepting profile information entered by the user and program instructions for determining the usage limit based on the profile information.

19. The device of claim 13, wherein the program instructions for determining the usage statistic comprises program instructions for determining a moving average of the number of keystrokes entered by the user over a specified time.

* * * * *